US011372749B2

(12) United States Patent
Wiener et al.

(10) Patent No.: US 11,372,749 B2
(45) Date of Patent: *Jun. 28, 2022

(54) DEPENDENCY MAPPING BETWEEN PROGRAM CODE AND TESTS TO RAPIDLY IDENTIFY ERROR SOURCES

(71) Applicant: ServiceNow, Inc., Santa Clara, CA (US)

(72) Inventors: David Joshua Wiener, Ramat Biet Shemesh (IL); Adar Margalit, Modiin (IL); Yaron Hecker, Tel Aviv (IL); Haviv Rosh, Modiin (IL); Nir Yariv, Modiin (IL)

(73) Assignee: ServiceNow, Inc., Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/828,555

(22) Filed: Mar. 24, 2020

(65) Prior Publication Data
US 2020/0293437 A1 Sep. 17, 2020

Related U.S. Application Data

(63) Continuation of application No. 15/981,544, filed on May 16, 2018, now Pat. No. 10,621,077.

(51) Int. Cl.
G06F 11/36 (2006.01)
G06F 8/71 (2018.01)
G06F 8/41 (2018.01)

(52) U.S. Cl.
CPC .......... G06F 11/3688 (2013.01); G06F 8/433 (2013.01); G06F 8/71 (2013.01); G06F 11/3676 (2013.01)

(58) Field of Classification Search
CPC .. G06F 11/3676; G06F 11/3688; G06F 8/433; G06F 8/71
See application file for complete search history.

(56) References Cited

U.S. PATENT DOCUMENTS 6,678,887 B1  1/2004 Hallman
7,315,973 B1* 1/2008 Wise ................. G06F 30/33
                                            714/741

(Continued)

OTHER PUBLICATIONS

Partin P. Robinllard and Gail C. Murphy, Concern Graphs: Finding and Describing Concerns Using Structural Program Dependencies, ACM, 2002, retrieved online on Feb. 9, 2022, pp. 406-416. Retrieved from the Internet: <URL: https://ieeexplore.ieee.org/stamp/stamp.jsp?tp=&arnumber=1007986>. (Year: 2002).*

(Continued)

Primary Examiner — Hanh Thi-Minh Bui
(74) Attorney, Agent, or Firm — Fletcher Yoder PC

(57) ABSTRACT

An example system includes (i) a software product having a plurality of code units that accesses a database, (ii) a processor, and (iii) a non-transitory computer readable storage medium having stored thereon software tests and instructions that cause the processor to: execute the software tests on a first version of the software product; determine a first mapping between each respective software test and one or more of the code units; determine a second mapping between each respective software test and one or more data units in the database; determine that, between a second version and the first version of the software product, a particular code and data unit have changed; select, from the first and the second mappings, a set of software tests with mappings to the particular code unit or data unit; and execute the set of software tests on the second version of the software product.

18 Claims, 14 Drawing Sheets

(56) References Cited

U.S. PATENT DOCUMENTS

| | | |
|---|---|---|
| 8,583,414 B1 | 11/2013 | Aldrich et al. |
| 8,983,982 B2 | 3/2015 | Rangarajan |
| 9,389,986 B2 | 1/2016 | Mathew et al. |
| 9,508,051 B2 | 11/2016 | Falk |
| 9,535,674 B2 | 1/2017 | Cooper |
| 9,557,969 B2 | 1/2017 | Sharma |
| 2005/0132346 A1 | 6/2005 | Tsantilis |
| 2016/0094502 A1 | 3/2016 | Pollack et al. |
| 2016/0328314 A1 | 11/2016 | Yadava et al. |
| 2017/0235661 A1 | 8/2017 | Liu et al. |
| 2017/0300405 A1 | 10/2017 | Yashayeva et al. |
| 2018/0121322 A1 | 5/2018 | Reyes |
| 2020/0073781 A1* | 3/2020 | Falko .................. G06F 11/3636 |

OTHER PUBLICATIONS

David Georg Reichelt and Stefan Kuhne, How to Detect Performance Changes in Software History: Performance Analysis of Software System Version, ACM, 2018, retrieved online on Dec. 6, 2019, pp. 183-188. Retrieved from the Internet: <URL: http://delivery.acm.org/10.1145/3190000/3186404/p 183-reichelt.pdf?i > (Year: 2018).

* cited by examiner

TEST 600

| | INSTRUCTIONS | BRANCHES | LINES | METHODS | CLASSES |
|---|---|---|---|---|---|
| CODE UNIT 606 | 100% | 100% | 100% | 100% | 100% |
| CODE UNIT 608 | 25% | 50% | 30% | 50% | 75% |
| CODE UNIT 610 | 0% | 0% | 0% | 0% | 0% |
| CODE UNIT 612 | 0% | 0% | 0% | 0% | 0% |
| CODE UNIT 616 | 90% | 80% | 75% | 100% | 100% |
| CODE UNIT 618 | 0% | 0% | 0% | 0% | 0% |
| CODE UNIT 620 | 55% | 50% | 60% | 90% | 90% |
| CODE UNIT 622 | 80% | 75% | 85% | 75% | 80% |

FIG. 6B

TEST 600

| | DATA VALUES | TABLE STRUCTURES |
|---|---|---|
| DATA UNIT 614 | 2% | 0% |
| DATA UNIT 624 | 0% | 0% |
| DATA UNIT 626 | 0% | 0% |

| | CODE UNIT 606 | CODE UNIT 608 | CODE UNIT 610 | CODE UNIT 612 | CODE UNIT 616 | CODE UNIT 618 | CODE UNIT 620 | CODE UNIT 622 |
|---|---|---|---|---|---|---|---|---|
| TEST 600 | X | X | | | X | | X | X |
| TEST 602 | | | X | | X | | | |
| TEST 604 | | | X | X | | X | | |

TEST 600 callout:
% COVERAGE INSTRUCTIONS: 75
...
% COVERAGE CLASSES: 90
MEMORY USAGE: 206,032 K
EXECUTION TIME: 5 SEC

FIG. 6E

| | DATA UNIT 614 | DATA UNIT 624 | DATA UNIT 626 |
|---|---|---|---|
| TEST 600 | X | | |
| TEST 602 | | X | |
| TEST 604 | | X | X |

TEST 604 callout:
DATA VALUES ACCESSED: 5
DATA VALUES MODIFIED: 3
TABLES ACCESSED: 2
TABLES MODIFIED: 1

DEPENDENCY MAPPING BETWEEN PROGRAM CODE AND TESTS TO RAPIDLY IDENTIFY ERROR SOURCES

CROSS REFERENCE TO RELATED APPLICATION

The present application claims priority to U.S. patent application Ser. No. 15/981,544, filed on May 16, 2018, the contents of which are entirely incorporated herein by reference, as if fully set forth in this application.

BACKGROUND

Computer software products are typically tested before being released to the public. A software product may be tested by having a software test provide one or more inputs to the software product and observing how the software product behaves. For instance, the software tests may check that, for each input, the software product produces a desired or expected output. Software testing may involve unit testing (e.g., testing of an individual software unit), integration testing (e.g., testing of a group of software units operating together), functional testing (i.e., testing to determine whether specified functionality desired in a system works properly), system testing (e.g., testing the software product in different hardware or operating system environments), stress testing (i.e., testing to determine how the software product behaves under unfavorable conditions), performance testing (e.g., testing to determine how long the software product takes to perform a given operation), and/or regression testing (i.e., testing to determine whether a modification to one software unit causes other software units to work incorrectly), among other possibilities. Although software testing may be automated to some extent, running multiple tests on the software product may nevertheless take a long time, thereby slowing down development of the software product.

SUMMARY

Modern software products may include large amounts of code (e.g., millions of lines of code). In order to test such modern software products, automated software tests may be used to provide numerous inputs and verify that the software product produces expected outputs and exhibits stable behavior. Such automated software tests may often take the form of large test libraries that include hundreds, thousands, or even millions of software tests. Running such large test libraries against a software product to test its functionality may be time consuming and may thus slow down the software development process. While running an entire library of software tests against a software product may be acceptable at certain milestones in the software development process, programmers often make small changes to limited portions of the software product. Thus, rather than running the entire test library each time a portion of the software product is modified, it is beneficial to identify a smaller subset of tests from the library that focus on testing the modified portions.

Accordingly, to identify such smaller subsets of tests, a computing device, which may be referred to as a testing device, may execute each respective software test of a plurality of software tests in the test library on or against a first version of the software product. The software product may include a plurality of code units (e.g., files, functions, classes, methods, lines, instructions, etc.) and may use (i.e., access or modify) data units in a database. While a given software test is being executed on or against the first version of the software product, the testing device may collect code coverage data and database coverage data. The code coverage data may indicate the extent of execution of different code units of the software product in response to the given test being run on or against the software product. Similarly, the database coverage data may indicate the extent of accessing or modification of data units within the database. The data units may include (i) table structures into which data within the database is organized or (ii) data values stored in the table structures.

The code coverage data may be used to determine a first mapping between the respective software test and the code units executed by the respective software test. Similarly, the database coverage data may be used to determine a second mapping between the respective software test and the data units used by the respective software test. When the software product is modified, the testing device may identify changes between the first version of the software product and the modified (second) version of the software product. Based on the identified changes, the testing device may use the first mapping and the second mapping to select a set of software tests that will evaluate the modified code and data units. That is, rather than executing all or most of the software tests in the library, the testing device might only select tests that invoke or use the modified code or data units.

Notably, by determining both the first and the second mapping, the testing device may evaluate the impact of code changes as well as changes in database structures or values stored in the database structures. Many code units rely on the database being structured in a particular way or containing particular values that configure the code units to operate in a specific manner. A code unit that has not been changed, but uses a data unit that has been modified, may fail or underperform a software test when using the modified data unit. If data unit mappings were not considered by the testing device, the set of software tests selected to test the software product might not test this unchanged code unit, thus failing to identify the failure or underperformance. Even if a software test is selected that happens to test the unchanged code unit, determining that the modified data unit, rather than the unchanged code unit, caused the test failure might be more time consuming. On the contrary, identifying the modification to the data unit and using the second mapping may facilitate identification of the cause of the test failure by automatically highlighting the modified data unit as a potential cause of the failure.

Additionally, in some implementations, the data units may store additional code units. That is, rather than having all code units stored as files, some of the code units may be stored in the database. If the testing device did not consider the data unit mappings, such code units might not be mapped as part of the first mapping and might thus be omitted during the testing process even when they contain changes that should be verified by the software tests. However, by using both the first and second mappings, the testing device may be configured to check code units stored as files as well as code units stored as entries (i.e., values) in the database for any changes or modifications that should be tested. Accordingly, using both the first mapping and the second mapping allows for a more thorough and accurate identification of changes in the software product, including the databases used thereby, that are to be software tested to verify desired functionality of the software product.

Further, the first and second mappings may also be used to select a set of tests that meet particular criteria. For example, the testing device may select a set of tests that tests at least a threshold fraction of the modifications made to the code and data units, executes in under a threshold time, or uses less than a threshold extent of computing resources (e.g., memory, processors, etc.), among other criteria. Additionally, the code coverage data and the database coverage data may be used to organize the first and second mappings into a task graph indicating dependencies between the different code and data units. The task graph may be used to, for example, identify groups of software tests that are parallelizable or to trace a software error to its root cause, among other possibilities. Programmers may thus be able to fine-tune the thoroughness, runtime, resource usage, and resource scheduling during the testing process, allowing the testing process to be matched to the desired pace of software development.

Accordingly, a first example embodiment may involve a computing system including a software product. The software product includes a plurality of code units and accesses a database. The computing system may also involve a processor and a non-transitory computer readable storage medium having stored thereon a plurality of software tests and instructions that, when executed by the processor, cause the processor to execute the plurality of software tests on a first version of the software product. The instructions may also cause the processor to determine a first mapping between each respective software test of the plurality of software tests and one or more of the code units executed by the respective software test. The instructions may additionally cause the processor to determine a second mapping between each respective software test of the plurality of software tests and one or more data units in the database used by the respective software test. The instructions may further cause the processor to determine that, between a second version of the software product and the first version of the software product, a particular code unit and a particular data unit have changed. The instructions may yet additionally cause the processor to, based on the particular code unit and the particular data unit having changed, select, from the first mapping and the second mapping, a set of software tests from the plurality of software tests with mappings to the particular code unit or the particular data unit. The instructions may yet further cause the processor to execute the set of software tests on the second version of the software product.

In a second example embodiment, a method may involve executing, by a testing device, a plurality of software tests on a first version of a software product. The software product includes a plurality of code units and accesses a database. The method may also involve determining, by the testing device, a first mapping between each respective software test of the plurality of software tests and one or more of the code units executed by the respective software test. The method may additionally involve determining, by the testing device, a second mapping between each respective software test of the plurality of software tests and one or more data units in the database used by the respective software test. The method may yet additionally involve determining, by the testing device, that, between a second version of the software product and the first version of the software product, a particular code unit and a particular data unit have changed. The method may further involve, based on the particular code unit and the particular data unit having changed, selecting, by the testing device, from the first mapping and the second mapping, a set of software tests from the plurality of software tests with mappings to the particular code unit or the particular data unit. The method may yet further involve executing, by the testing device, the set of software tests on the second version of the software product.

In a third example embodiment, an article of manufacture may include a non-transitory computer-readable medium, having stored thereon program instructions that, upon execution by a computing system, cause the computing system to perform operations. The operations may involve executing a plurality of software tests on a first version of a software product. The software product includes a plurality of code units and accesses a database. The operations may also involve determining a first mapping between each respective software test of the plurality of software tests and one or more of the code units executed by the respective software test. The operations may additionally involve determining a second mapping between each respective software test of the plurality of software tests and one or more data units in the database used by the respective software test. The operations may yet additionally involve determining that, between a second version of the software product and the first version of the software product, a particular code unit and a particular data unit have changed. The operations may further involve, based on the particular code unit and the particular data unit having changed, selecting from the first mapping and the second mapping, a set of software tests from the plurality of software tests with mappings to the particular code unit or the particular data unit. The operations may yet further involve executing the set of software tests on the second version of the software product.

In a fourth example embodiment, a system may include various means for carrying out each of the operations of the second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B illustrates code coverage of a software product, in accordance with example embodiments.

FIG. 6C illustrates database usage by a software product, in accordance with example embodiments.

FIG. 6D illustrates a mapping between software tests and code units, in accordance with example embodiments.

FIG. 6E illustrates a mapping between software tests and data units, in accordance with example embodiments.

DETAILED DESCRIPTION

Figure 1:
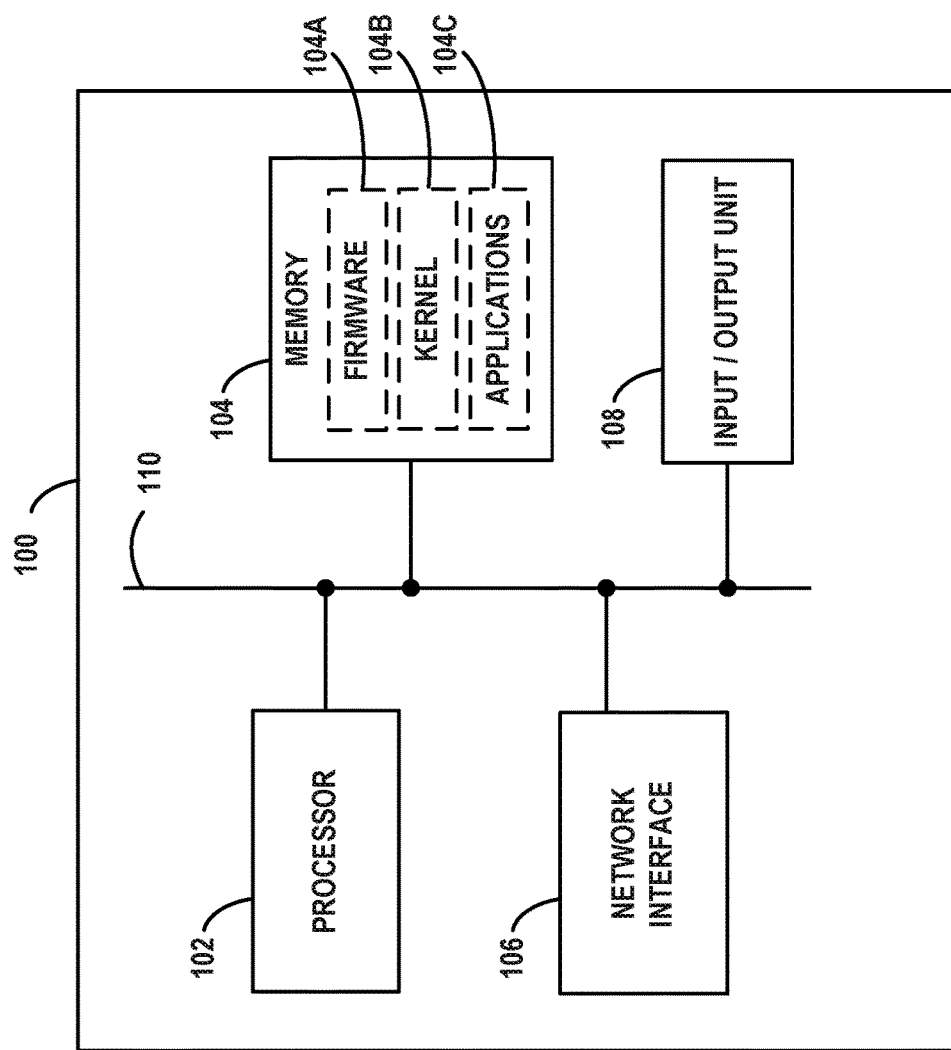
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
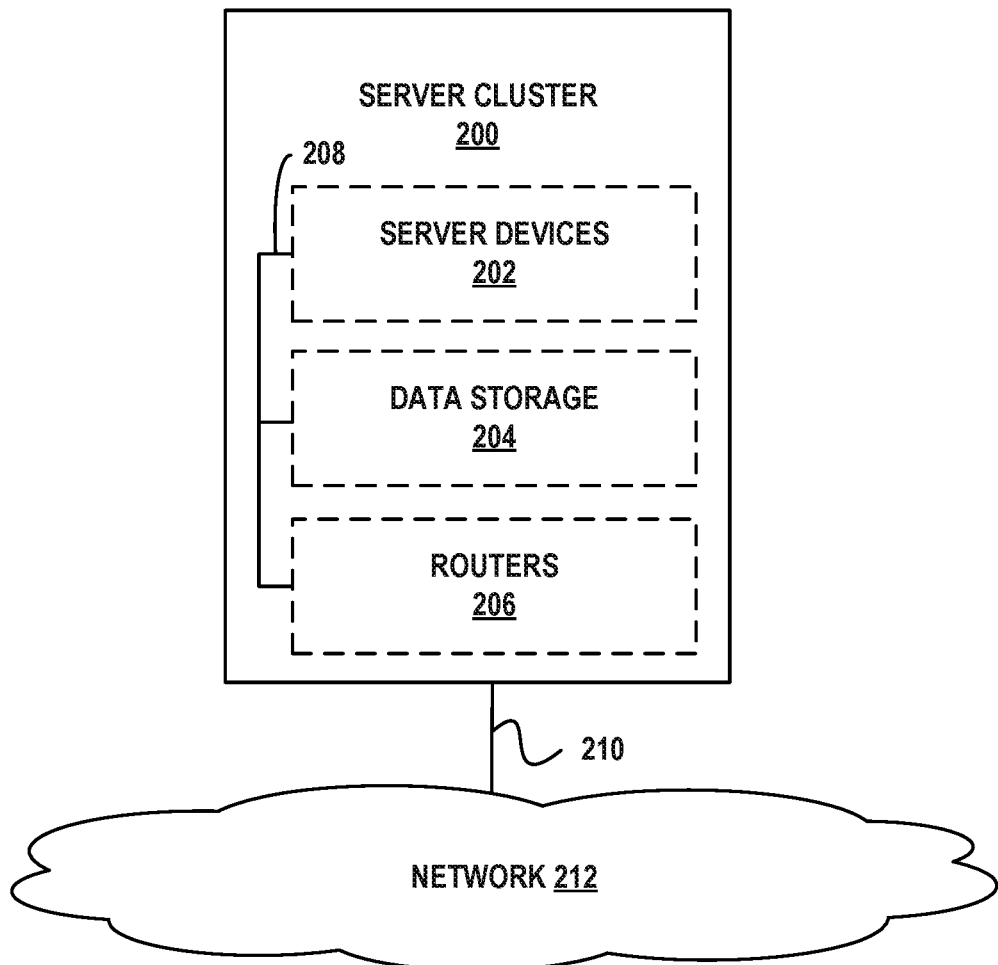
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
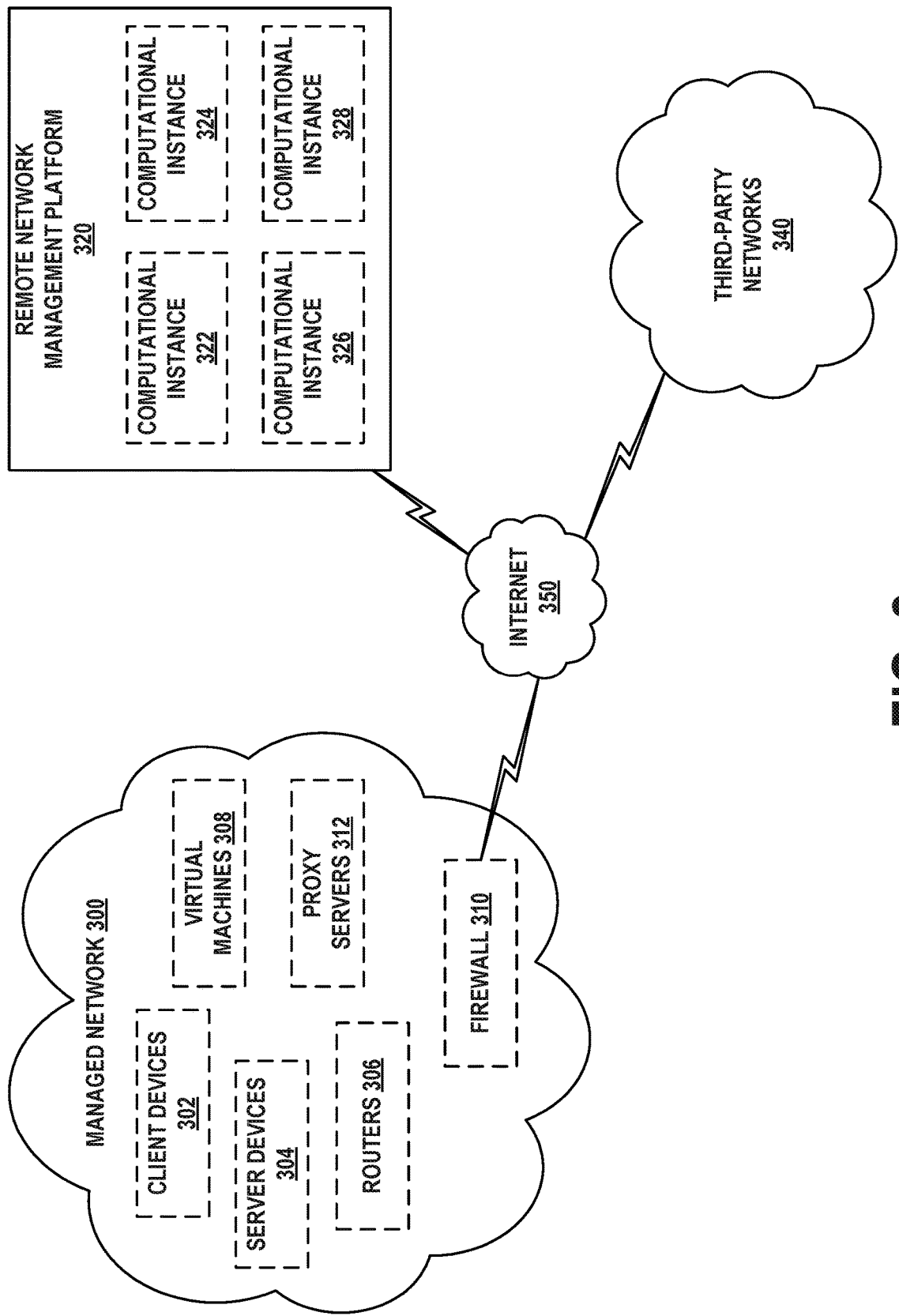
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
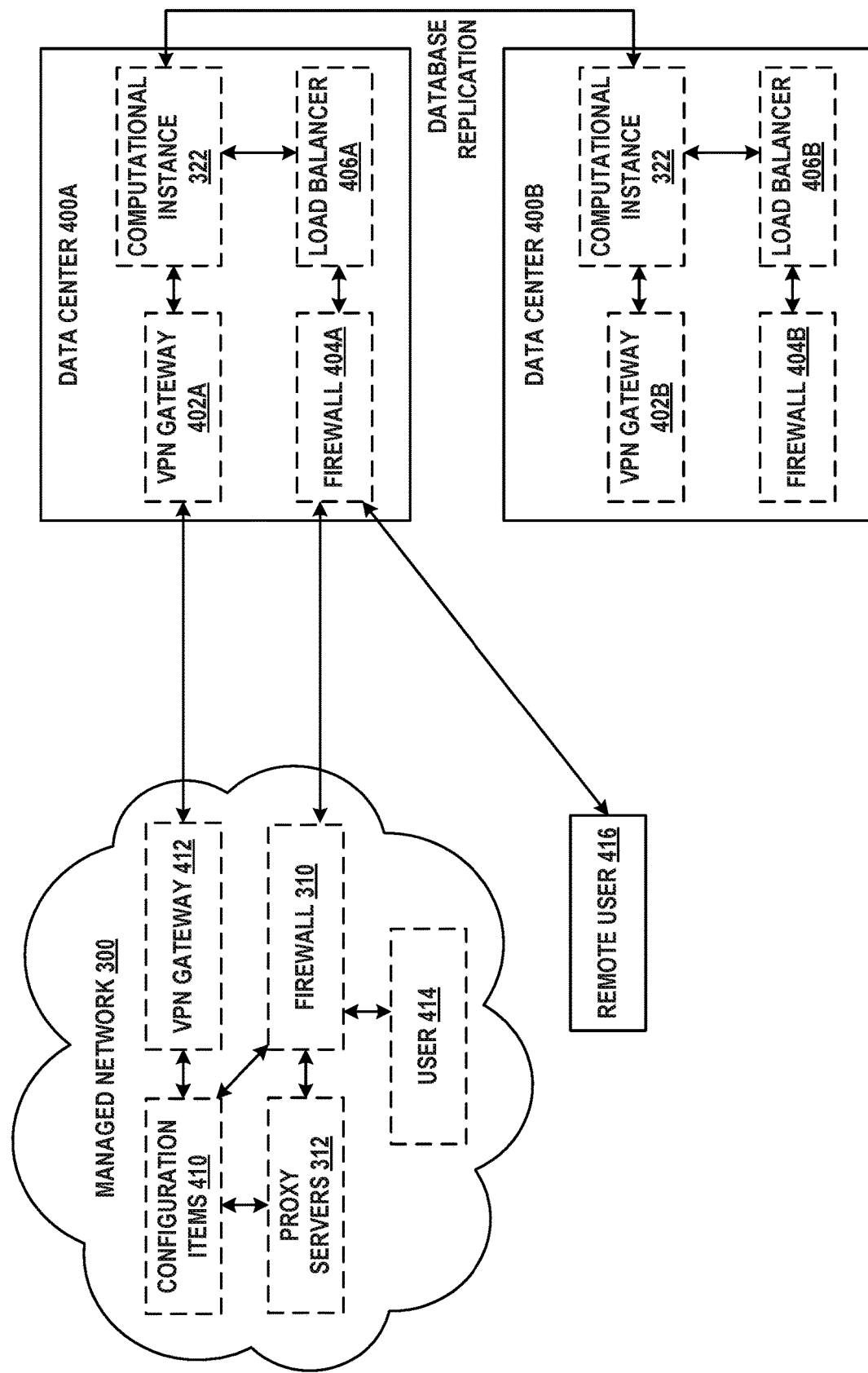
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
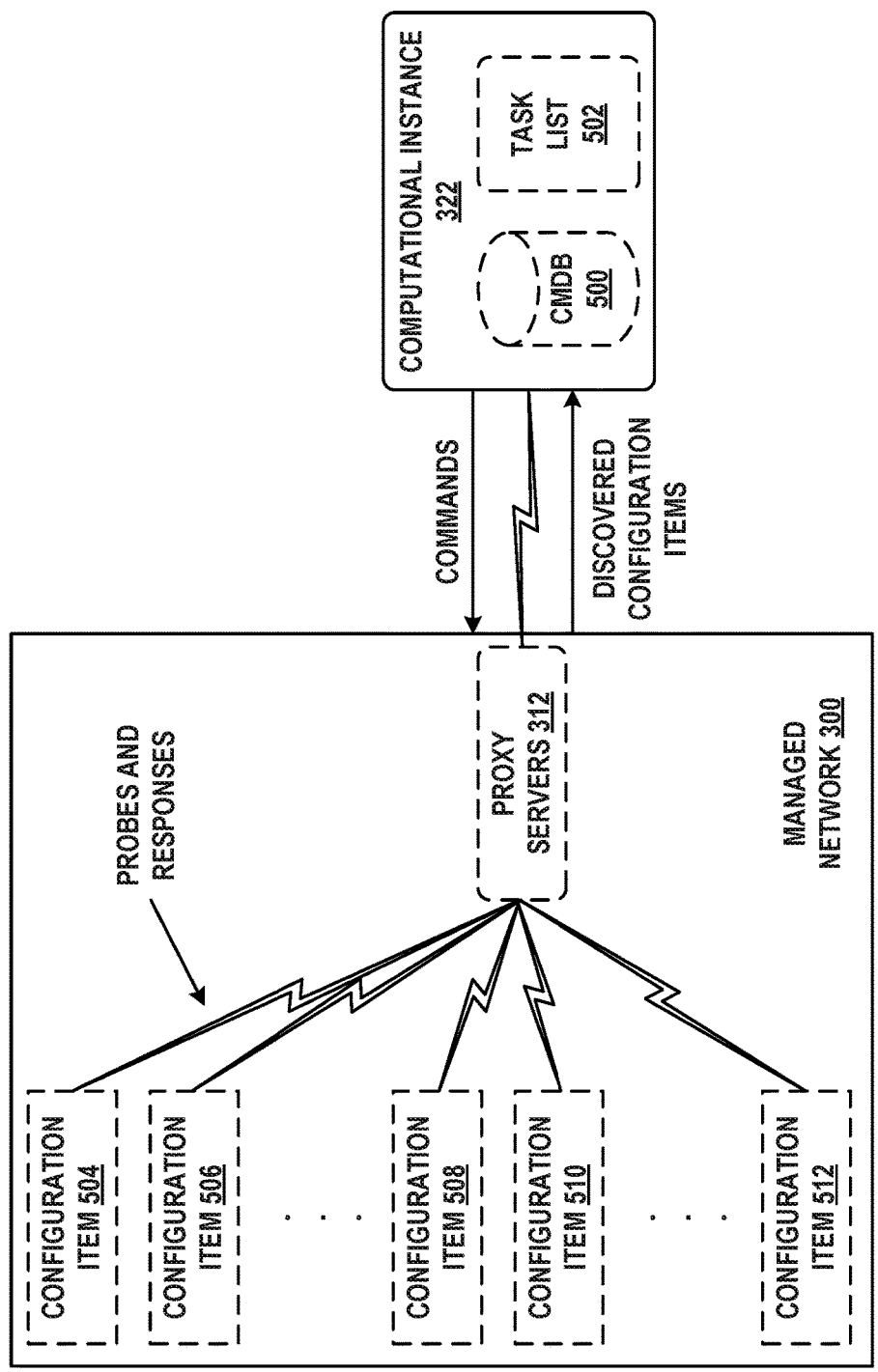
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
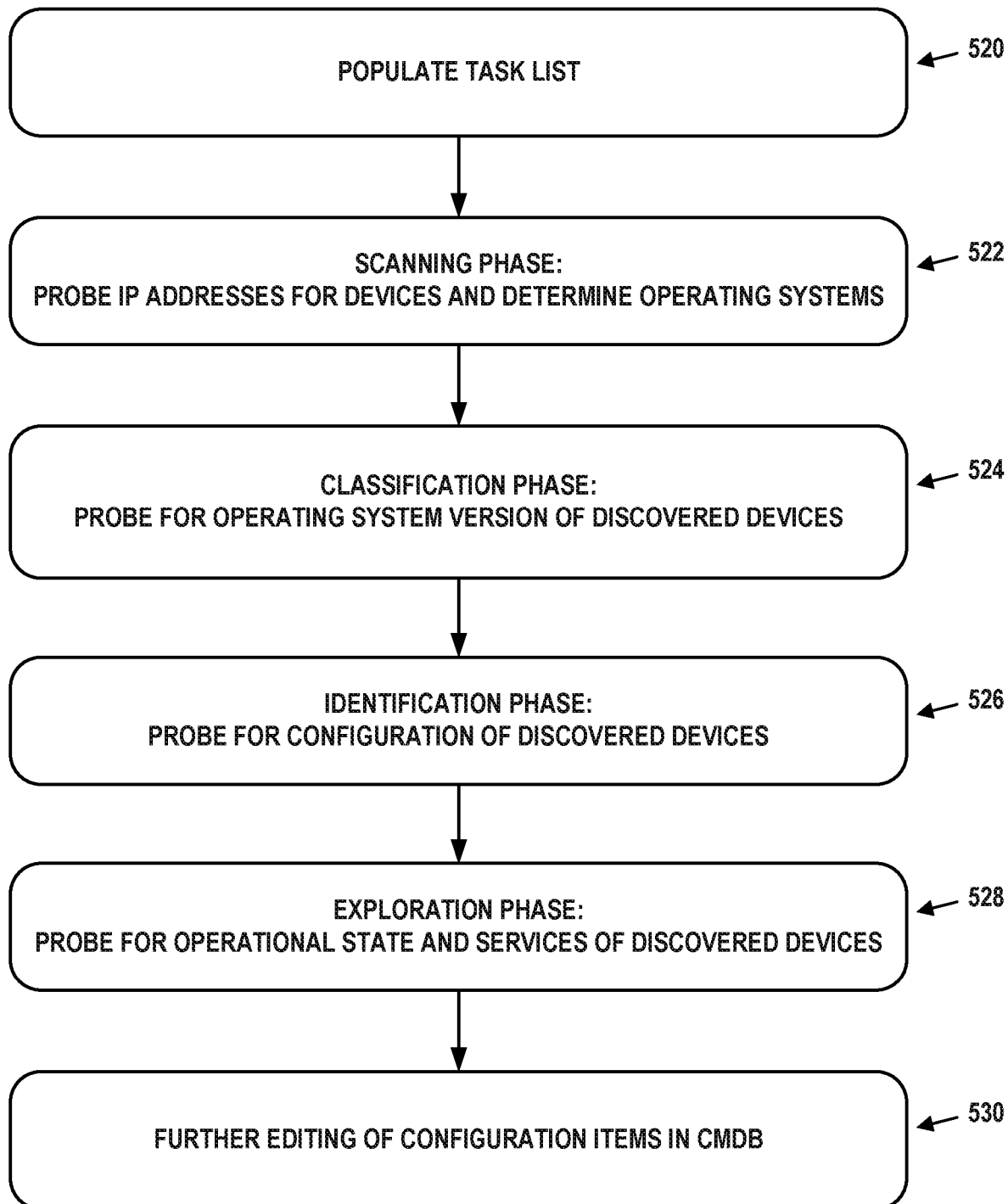
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE MAPPING BETWEEN CODE, DATA, AND SOFTWARE TESTS

Software development is an iterative process in which source code and data stored in databases are refined to improve a software product by implementing additional functionality, removing defects, or improving performance of the software product. During development, the software product is often evaluated using software tests that automate the evaluation process. However, thorough evaluation often involves executing a large library of software tests against the software product, which could take a long time and thereby slow down development of the software product. While executing the entire library or a significant portion thereof may be acceptable at major milestones in the software development process, the time penalty associated with such execution makes this approach undesirable for testing smaller changes in the source code or databases.

For example, a software developer making changes to a single code unit or data unit might not need to execute the entire software test library against the updated software product because the updated code or data unit might be invoked by a small subset of the tests within the test library. Similarly, when multiple developers merge multiple code units or data units into a single build or version of the software product, only tests that execute the modified units, or units in close proximity to the modified units (e.g., units that call or are called by the modified units), might need to be executed. Notably, a software test may invoke or execute the modified unit directly, by calling the modified unit, or indirectly, by calling another unit that then calls the modified unit.

Accordingly, provided herein are systems and operations for systematically identifying sets of software tests that evaluate modified code units and modified data units, and may do so according to one or more sets of constraints such as test coverage, test runtime, computing resource usage, and test parallelizability, among other possibilities. Additionally, because modern software often relies on coordination between both code units and data units, the operations herein described map the interdependence between software tests and code units, as well as software tests and data units. By considering the impact of data units on the software product, errors may be identified not only in code units but also in (i) data units on which the code units depend for successful execution and (ii) additional code units that are stored in the database rather than being stored in files as part of the source code of the software product, among other possible sources of errors.

Figure 6A:
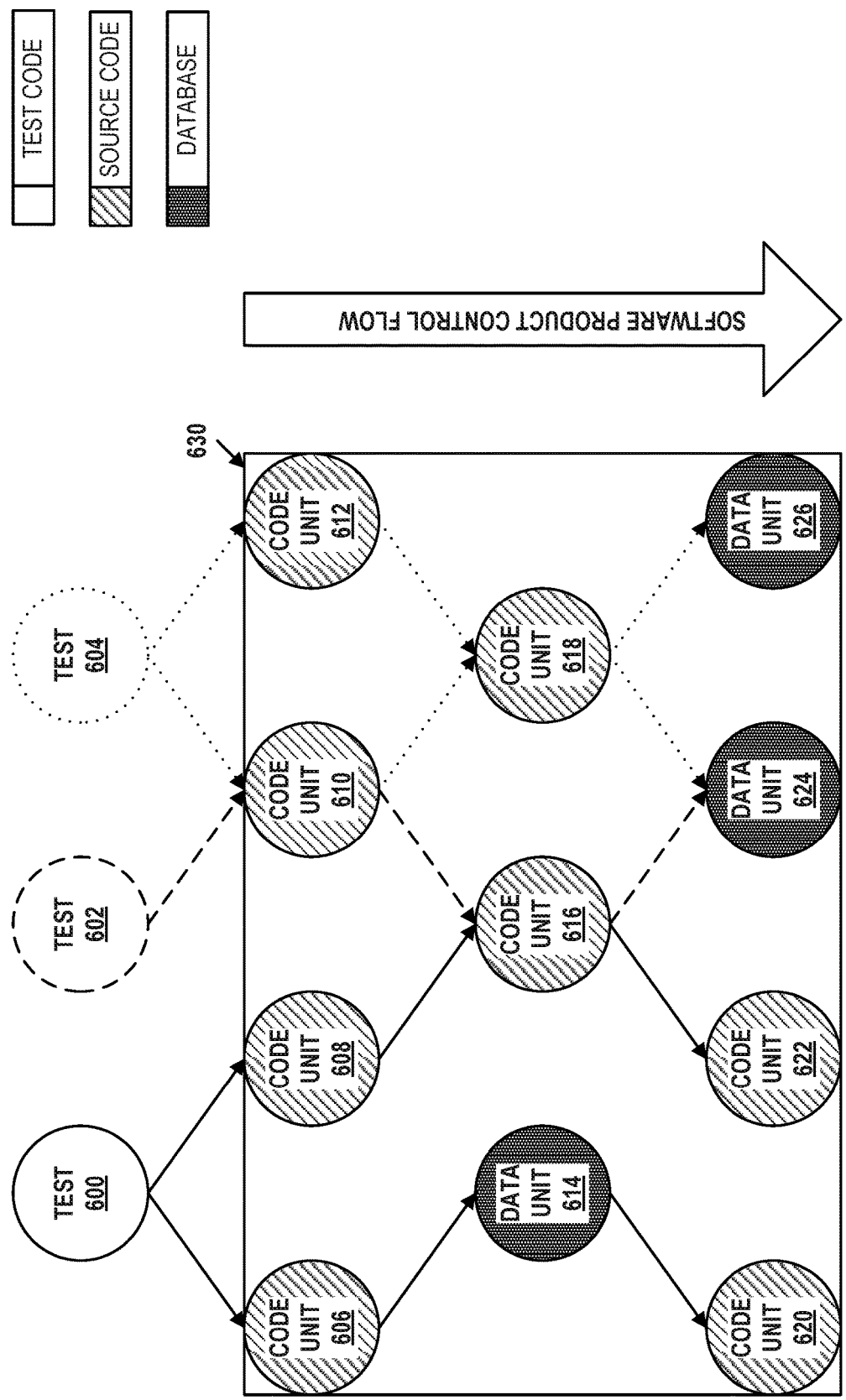
FIG. 6A illustrates control flow of a software product, in accordance with example embodiments.

FIG. 6A illustrates software control flow of an example software product 630 resulting from testing of software product 630 by a plurality of software tests. Software product 630 may include code units 606, 608, 610, 612, 616, 618, 620, and 622 (i.e., code units 606-622) and may access data units 614, 624, and 626 in a database. Software tests 600, 602, and 604 may be used to determine whether software product 630 operates as expected for its intended purpose. That is, software tests 600, 602, and 604 may be used to determine whether software product 630 successfully implements any desired functionality, is capable of handling a desired range of input values, does not contain defects, and executes within a desired time frame, among other factors.

In some cases, additional software tests (not shown) may be used to test software product 630, which may cause software product 630 to execute additional code units and access additional data units. Software tests 600, 602, and 604, as well as the additional software tests, may be part of a larger software test library that includes tens, hundreds, thousands, or millions of software tests, each of which may be used as part of the operations herein described.

Code units 606-622 may represent a plurality of different levels of code aggregation (i.e., code hierarchy) corresponding to different levels of granularity. For example, code units 606-622 may represent code files, functions, classes (i.e., object-oriented programming classes), methods within classes, statements, lines, branches, or instructions (i.e., assembly or binary instructions), among other possibilities.

Similarly, data units 614, 624, and 626 may represent a structure of the database or the contents of the database stored within or organized according to the structure. For example, data units 614, 624, and 626 may represent structures of tables in the database or values stored within the table structures, among other possible parameters of the database. Structures of tables may include the amounts of rows and columns in the tables, the data type of the rows or columns, the data format of the data within the tables, or the encoding of the data within the tables, among other possibilities. In some implementations, data units 614, 624, and 626 may represent configuration items stored in a CMDB.

Execution of test 600 against software product 630 may cause execution of code units 606, 608, 616, 620, and 622, and may cause software product 630 to access or modify data unit 614. Notably, test 600 and the lines interconnecting the code and data units used thereby are indicated with a solid line pattern. More specifically, test 600 may provide a first input to software product 630 that causes execution of code unit 606. In response, code unit 606 accesses data unit 614, which in turn stores code unit 620 (e.g., JavaScript, extensible markup language (XML)) that is executed after being retrieved from the database. Test 600 may subsequently provide a second input to software product 630 causing execution of code unit 608. In response, code unit 608 causes execution of code unit 616, which in turn causes execution of code unit 622.

Similarly, execution of test 602 against software product 630 causes execution of code units 610 and 616, and accessing or modification of data unit 624, as indicated by the dashed line pattern. That is, test 602 may provide an input to software product 630 that causes execution of code unit 610, which in turn causes execution of code unit 616. Code unit 616 may access data unit 624. However, code unit 616 might not invoke or cause the execution of code unit 622 when code unit 616 is executed in response to the input initially provided by test 602, as indicated by the absence of a dashed line between code units 616 and 622.

Likewise, execution of test 604 against software product 630 causes execution of code units 610, 612, and 618, and accessing or modification of data units 624 and 626, as indicated by the dotted line pattern. Test 604 may provide a first input to software product 630 that causes execution of code unit 610, which in turn causes execution of code unit 618. Code unit 618, when called by code unit 610, accesses data unit 624. Test 604 may also provide a second input to software product 630 that causes execution of code unit 612, which in turn causes execution of code unit 618. Code unit 618, when called by code unit 612, accesses data unit 626. However, code unit 610 might not invoke or cause the execution of code unit 616 when code unit 610 is executed in response to the input initially provided by test 604, as indicated by the absence of a dotted line between code units 610 and 616.

After execution of the respective code units, software product 630 may return an output to the corresponding test, allowing the output to be evaluated by the corresponding test to determine whether software product 630 operates as desired. Notably, the software control flow illustrated in FIG. 6A for software product 630 is provided as an example. The operations herein described may be equally applicable to other software products, which may be more complex (e.g., have more code units and/or data units) or less complex (e.g., have fewer code units and/or data units). For example, in some software products, multiple software tests executed thereon may ultimately converge to a group of one or more code units (e.g., library functions used by the code units invoked by the multiple software tests).

In order to quantify the extent to which each of tests 600, 602, and 604 evaluates or covers the different code units and data units of software product 630, a computing device, which may be referred to as a testing device, may determine code coverage data and database coverage data while executing the software tests. To that end, software product 630 may be modified (e.g., injected) with additional code that allows the testing device to determine which code units or portions thereof are being executed and which data units or portions thereof are being accessed or modified by the software tests. The additional code might be injected into software product 630 temporarily for the purpose of determining code coverage, but might not form part of a publicly-available release of software product 630. In an example implementation, each code unit may be modified to write to a log file when it is invoked. The log file may then be read to determine the software control flow resulting from execution of a given software test. In another example, each code unit may be modified to add software tracing calls to generate an indication of the code units executed by a given software test.

Alternatively or additionally, in some implementations, the code coverage data and database coverage data may be determined without injecting code into software product 630. The testing device may instead execute software product in a computing environment configured to track the execution of the different parts of software product 630. The code coverage data may be determined using a software tool such as Java Code Coverage (JaCoCo), Coverage.py, ATLASSIAN CLOVER®, Bullseye Coverage, FrogLogic CoCo, or MICROSOFT VISUAL STUDIO®, among other possibilities. The particular software tool may be selected based on, for example, the programming language in which a software product is written.

FIG. 6B illustrates example code coverage data that may be generated based on execution of test 600 against software product 630. The code coverage data may indicate, for each of code units 606-622, the extent to which classes, methods, lines of code, code branches, and instructions, among other possibilities, are executed by software test 600. Notably, the format of the code coverage data may depend on the level of code abstraction, code aggregation, or code hierarchy represented by code units 606-622 (e.g., file, class, method, function, branch, etc.). For example, when code units 606-622 represent methods, the code coverage data might indicate coverage of methods, lines, branches, and instructions, but not of classes (i.e., the superset of methods). That is, the code coverage data may indicate coverage of the code unit and sub-units of the code unit, but not of constructs larger than the code unit. However, the testing device may be configured to allow the level of granularity of a code unit to be controlled by a user. That is, a user may be able to select the level of code abstraction, code aggregation, or code hierarchy represented by a code unit in order to control the software testing process with more precision.

Code coverage data may be determined independently for each software test. That is, each respective software test may be executed individually to determine the code units and data units that the respective software test invokes. Executing multiple tests simultaneously might not allow for a determination of which one of the multiple tests caused the execution of a given code unit. Thus, independent code coverage data similar to that shown in FIG. 6B may be determined for each of tests 602 and 604 (as well as any additional software tests in a test library). FIG. 6B shows that test 600 does not invoke code units 610, 612, and 618, but executes code units 606, 608, 616, 620, and 622 and the different portions or sub-units thereof to the extents shown in the table.

The code coverage data may additionally indicate the order in which the code units are invoked. That is, the code coverage data may be used to determine the control flow of the software product, as shown in FIG. 6A, as well as a task graph as will be discussed with respect to FIGS. 8A and 8B.

FIG. 6C illustrates example database coverage data that may be generated based on execution of software test 600 against software product 630. The database coverage data indicates that test 600 accesses or modifies 2% of the data values stored in data unit 614, and does not modify any of the structures of tables within the database. As with the code coverage data, the testing device may determine the database coverage data for each software test individually. That is, additional and separate database coverage data may be determined for each of software tests 602 and 604 (as well as any other tests in the test library) in addition to the database coverage data shown in FIG. 6C for software test 600. Data units 614, 624, and 626 may be stored in one or more different databases, and the accessing or modification of data therein in response to a given software test may be represented by the database coverage data.

The database coverage data may be determined by comparing a first image or snapshot of the database taken before execution of a given software test to a second image or snapshot of the database taken after execution of the given software tests. By comparing the first and second images, the testing device may determine which values and table structures within the database were modified in response to execution of the given software test. Additionally or alternatively, the database may be configured to generate a record of any data usage (i.e., accesses or modifications), which may take the form of a database usage log file. In some implementations, accessing or modification of the database may be timestamped. Thus, the record may contain a date and time corresponding to any modifications or accesses that took place. The testing device may thus verify that a given software test used (i.e., accessed or modified) a data unit by comparing an execution time of the software test to a time at which the database or, more specifically, the data unit, has been accessed or modified.

The code coverage data determined for each of tests 600, 602, and 604 may be used to determine a first mapping between (i) software tests 600, 602, and 604 and (ii) one or more of code units 606-622. FIG. 6D illustrates an example first mapping. Test 600 is mapped to each of code units 606, 608, 616, 620, and 622, as represented by the "X" in the corresponding cell of the table shown in FIG. 6D. That is, test 600 is mapped to each code unit of software product 630 that is invoked by execution of test 600. Test 600 is mapped to code units based on the code coverage data collected for test 600. Similarly, test 602 is mapped to code units 610 and 616, and test 604 is mapped to code units 610, 612, and 618. The mappings for test 602 and 604 are similarly based on the code coverage data collected for these respective tests. Notably, the mapping illustrated in FIG. 6D corresponds to the control flow shown in FIG. 6A.

The first mapping may additionally include various parameters, including the code coverage data, associated with execution of a particular code unit in response to a given software test. For example, the first mapping may indicate that code unit 610, when executed in response to software test 604, takes 5 seconds to execute, uses 206,032 kilobytes of memory, invokes covers 90% of the classes within code unit 610, and invokes 75% of the instructions within code unit 610, among other execution parameters. Each combination of code unit and software test marked by an "X" may be associated with similar parameters. As described in more detail below, these parameters may be used in determining sets of software tests that, as a combination, meet desired execution criteria.

Similarly, the database coverage data determined for each of tests 600, 602, and 604 may be used to determine a second mapping between (i) software tests 600, 602, and 604 and (ii) one or more of data units 614, 624, and 626. FIG. 6E illustrates an example second mapping. Test 600 is mapped to data unit 614, as represented by the "X" in the corresponding cell of the table shown in FIG. 6E. That is, test 600 is mapped to each data unit that is invoked by test 600 based on the database coverage data collected for test 600. Similarly, test 602 is mapped to data unit 624, and test 604 is mapped to data units 624 and 626. Notably, the mapping illustrated in FIG. 6E corresponds to the control flow shown in FIG. 6A.

The second mapping may also include various parameters, including the database coverage data, associated with access or modification of a particular data unit in response to a given software test. For example, the mapping may indicate that data unit 626, when executed in response to software test 604, accesses 5 data values, modifies 3 data values, accesses 2 different database table structures, and modifies the structure of 1 database table, among other execution parameters. Each combination of data unit and software test marked by an "X" may be associated with similar parameters. As described in more detail below, these parameters may also be used in determining sets of software tests that, as a combination, meet desired execution criteria.

Notably, if the testing device relied only on the first mapping, the testing device might not identify the relationship between test 600 and code unit 620 which is stored in the database (i.e., in data unit 614), rather than as a file in a file system. Code unit 620 may form part of the first mapping in spite of being stored in the database because it represents executable code (e.g., a script) rather than data. However, in some cases, code units written in a particular programming language may be classified as either code or data, depending on programmer preference or other considerations.

Figure 7:
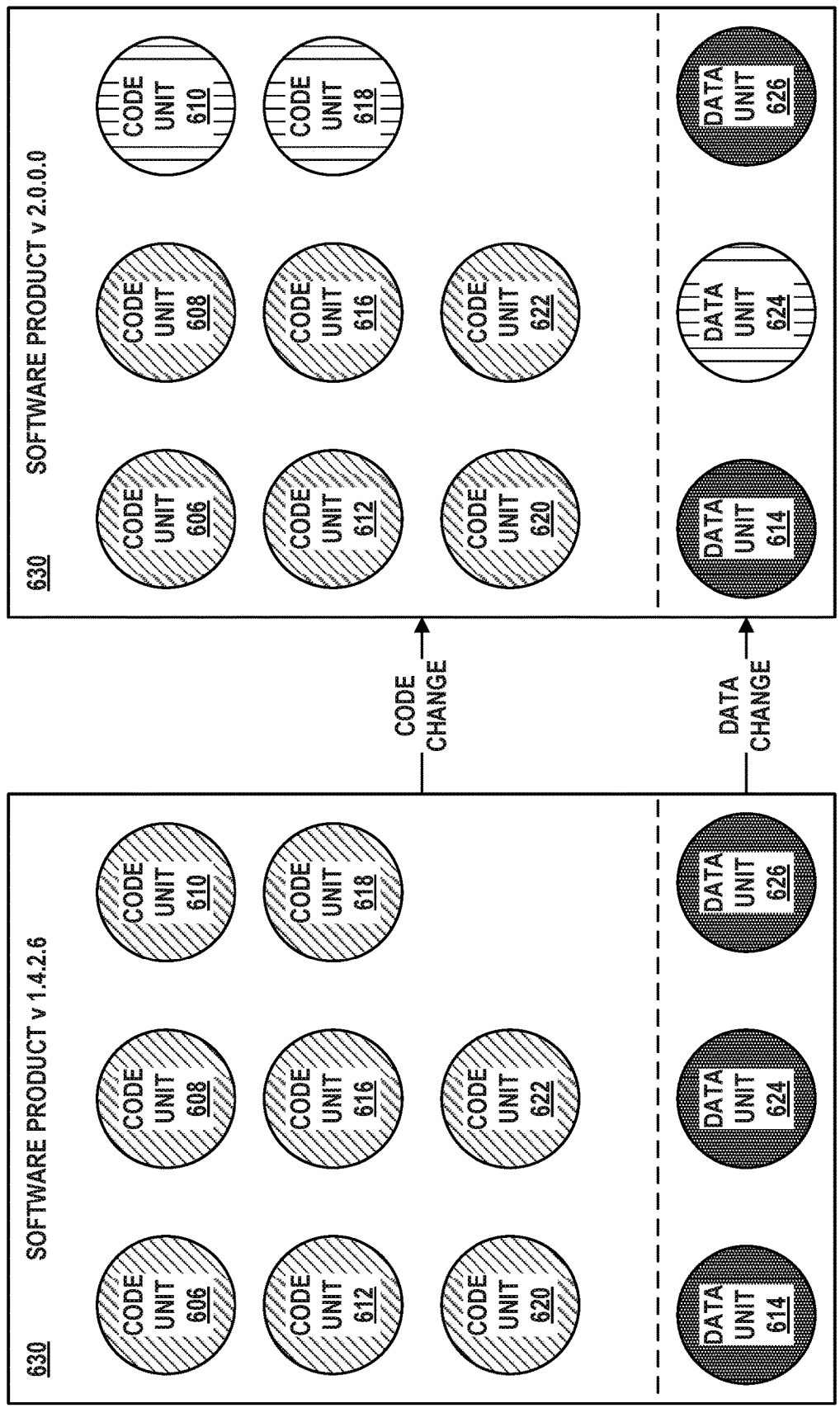
FIG. 7 illustrates a change in code units and data units across different versions of a software product, in accordance with example embodiments.

The first and second mappings may be used by the testing device to select software tests to execute against software product 630 when code units or data units of software product 630 are modified. FIG. 7 illustrates a change in software product 630 across the software development cycle. A first version (e.g., v 1.4.2.6) of software product 630 may be superseded, replaced, or upgraded to a second version (e.g., v 2.0.0.0) of software product 630. The extent of changes between the first version and the second version may vary, ranging from, for example, modifications of single lines of code to, for example, rewriting of entire code units or restructuring of entire data units. The changes may include additions of new code units or new data units. The changes may be made by any number of programmers at any stage during the software development process. Any changes between the first and second version may need to be tested to verify that the second version of software product 630 still operates for its intended purpose.

However, executing all or even a subset of all available software tests against the second version of software product 630 may be time consuming. For example, executing a large library of software tests against software product 630 might take several hours or days, putting further development and refinement of software product 630 on hold until the software tests finish running. Additionally, many of the software tests might not actually test code units or data units that have changed, or even test code or data units that interact with the code or data units that have changed. Running such tests may thus consume time without evaluating the effect of changes between the first and second versions on performance of software product 630.

Accordingly, the testing device may utilize the first and second mappings to more intelligently select software tests. The testing device may compare the first and second versions of software product 630 to identify code and data units that have been modified or changed between the first and second versions. For example, the testing device may identify that code units 610 and 618 as well as data unit 624 have changed between the first and second versions, as indicated by these units having a vertical line pattern in FIG. 7. A change in code units 610 and 618 may be identified by comparing the files containing, for example, the first and second versions of the source code or binary code of code units 610 and 618. A change in data unit 624 may be identified by comparing (i) a database image corresponding to the first version of software product 630 to (ii) a database image corresponding to the second version of software product 630. The testing device may compare table structures stored in the database or values stored in the table structures in the database, among other possibilities.

Additionally, a change in a code unit that is stored in a database (e.g., code unit 620) may be similarly identified by comparing database images corresponding to the first and second versions of software product 630. Notably, a modification in such a code unit might not otherwise be identifiable without considering the impact of data units on execution of software tests by determining database coverage data and the second mapping.

The testing device may use the first and second mappings shown in FIGS. 6D and 6E, respectively, to identify a set of software tests that impact the changed code units 610 and 618 and the changed data unit 624, respectively. This may take place at any point in the software testing process such as during, for example, unit testing or integration testing. Looking at FIG. 6D, code unit 610 is executed in response to execution of tests 602 and 604 against software product 630. Similarly, code unit 618 is executed in response to execution of test 604 against software product 630. Looking at FIG. 6E, data unit 624 is accessed or modified in response to execution of tests 602 and 604 against software product 630. Changes to code units 610 and 618 and data unit 624 can thus be evaluated by execution of software tests 602 and 604, but not test 600.

Accordingly, the testing device may determine, for each changed code unit, using the first mapping, software tests that cause the changed code unit to be executed. Similarly, the testing device may determine, for each changed data unit, using the second mapping, software tests that cause the changed data unit to be accessed or modified. The testing device may then determine a set of software tests to execute against the second version of software product 630 by taking the union of the software tests that cause the changed code units to be executed and the software tests that cause the changed data units to be accessed or modified.

Accordingly, a small extent of changes to code units or data units of software product 630 may be tested by running, for example, only 5% of available software tests, rather than running 100% the software tests, thus saving time and freeing up computational resources for other tasks.

In some implementations, the first and second mappings may be used independently of one another. That is, in some cases, the first mapping may be used to identify a set of software tests to test a change in software product 630 without also using the second mapping, and vice versa. Additionally, regardless of how the software tests are selected to test a given change in code or data, any software tests identified multiple times might be executed only once to avoid redundant executions of the same test.

Figure 8A:
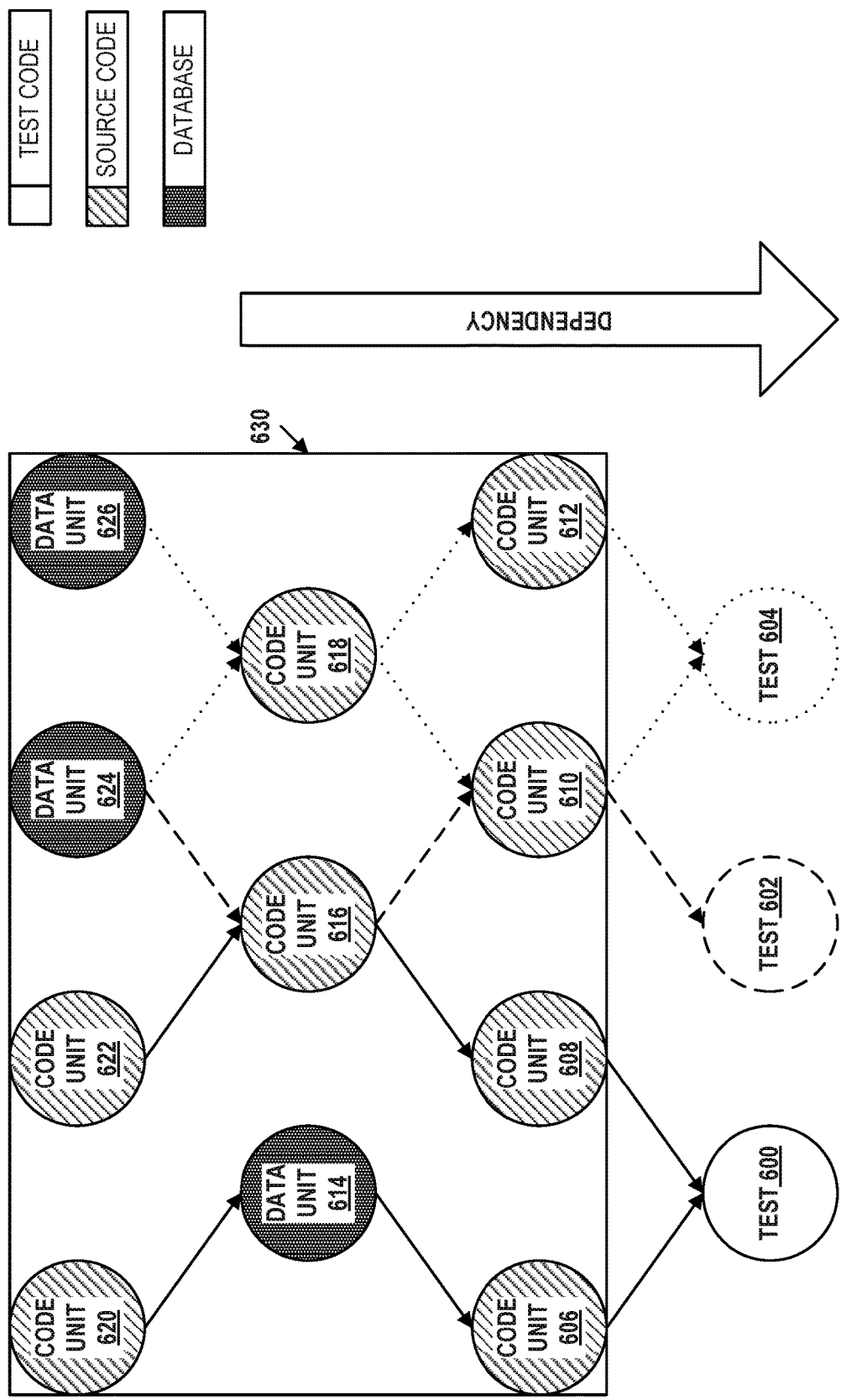
FIG. 8A illustrates dependencies between software tests, code units, and data units, in accordance with example embodiments.

In some implementations, the first and second mappings, rather than being expressed as a table, as shown in FIGS. 6D and 6E, may be expressed as a task graph, as illustrated in FIG. 8A. The task graph may, in addition to illustrating the mappings, indicate dependencies between the code and data units that make up software product 630. Specifically, the first and second mappings, as well as the code coverage and database coverage data, may be used by the testing device to determine dependencies between software tests 600-604, code units 606-622, and data units 614-626. The dependencies may indicate an order in which code units 606-622 are executed and data units 614-626 are accessed or modified in response to execution of tests 600-604 against software product 630. For example, code units 608 and 610 are each dependent on code unit 616 because each of them calls code unit 616 during execution. Notably, the dependencies shown in FIG. 8A are the inverse of the software control flow illustrated in FIG. 6A.

Figure 8B:
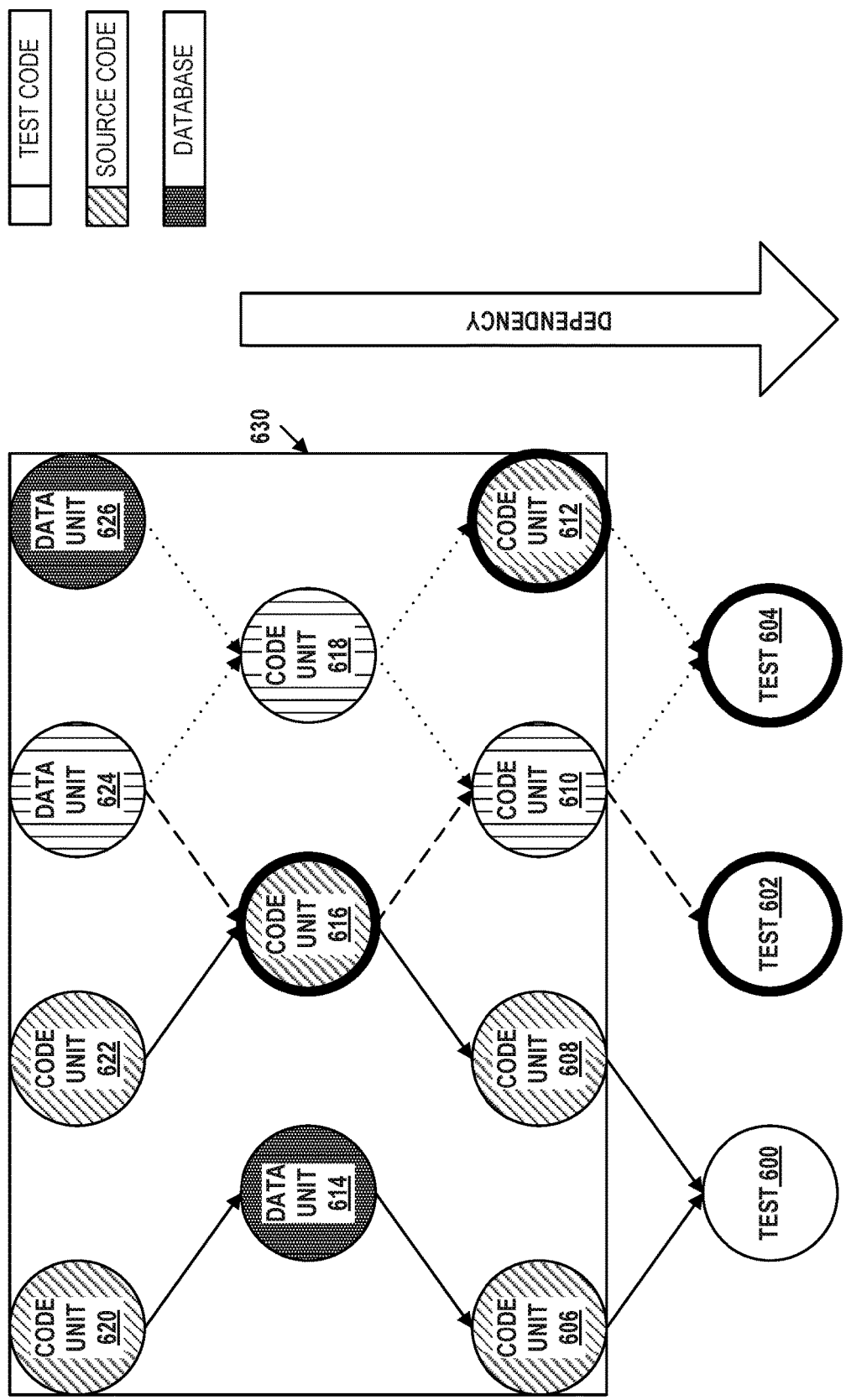
FIG. 8B illustrates software tests and code units affected by a change in a software product, in accordance with example embodiments.

The task graph illustrated in FIG. 8A may, like the mappings shown in FIGS. 6D and 6E, be used to identify software tests that will evaluate any changed code or data units of software product 630. FIG. 8B illustrates code units 610 and 618 and data unit 624 that have been changed between the first and second versions of software product 630, as shown in FIG. 7. Tests invoking changed code or data units may be identified by traversing the task graph downwards from the changed code or data unit to the corresponding software tests at the bottom of the graph. Notably, each downward traversal along the task graph should follow the lines of a single pattern. For example, a first traversal from data unit 624 should follow the dashed line to code unit 616, code unit 610, and test 602, thus identifying test 602 as a test that invokes accessing or modification of data unit 624. Similarly, a second traversal from data unit 624 should follow the dotted line to code unit 618, along a first branch through code unit 610 to test 604, and along a second branch through code unit 612 to test 604, thus identifying test 604 as another test that invokes accessing or modification of data unit 624.

However, in addition to selecting the set of software tests to evaluate particular code and data changes, the dependencies expressed by the task graph of FIGS. 8A and 8B may also be used to more accurately and quickly identify the cause or source of errors in the code or data units that are executed by a particular software test. Notably, the task graph may be used to identify the proximity of (i) unmodified code and data units (indicated with a heavy outline) executed by the software tests to (ii) code or data units that have been modified (indicated with a vertical line pattern). Since the code and data units of a software product often coordinate with one another to produce the desired functionality, changes to certain code or data units may reveal preexisting errors in unmodified code or data units. Unmodified code or data units that are closest to a given modified code or data unit may be more likely to be the cause of an error than code or data units further away from the modified code or data unit.

The testing device may thus be configured to, in response to software product 630 failing or underperforming on a software test, determine a hierarchy of potential sources of error causing the failure or underperformance. For example, when software test 600 fails, and assuming only code unit 622 has been modified, the hierarchy of potential sources of error may include code unit 622, code unit 616, and code unit 608, ordered from highest to lowest probability of being the cause of the error.

Additionally, the dependencies expressed by the task graph of FIGS. 8A and 8B may be used to determine an order in which the software tests are executed. For example, the task graph may be used to identify combinations of parallelizable tests. Two or more software tests may be parallelizable when they use mutually exclusive data units or utilize complimentary amounts of computing resources (e.g., memory resources, processing resources), among other factors. Usage of a complementary amount of resources by two software tests may involve, for example, usage of 40% of the computing resources by one of the tests and usage of 50% of the computing resources by the other software test (with 10% of the resources remaining unused). On the other hand, two software tests whose combined usage of computing resources would be greater than 100% of the available resources would not be considered complimentary. Thus, a group of software tests utilize a complimentary amount of computing resources when their total usage or computational resources is near (e.g., within 10% or 20% of) 100% of the available computing resources.

For example, software tests 602 and 604 each use data unit 624. Tests 602 might erroneously modify data unit 624. When both tests are executed simultaneously, test 604 may subsequently utilize the erroneously modified data unit 624 before it could be reset or corrected, resulting in apparent failure of test 604, where in fact it was execution of test 602 that caused the failure. Such a problem may be avoided by scheduling tests 602 and 604 to be executed sequentially and by resetting data unit 624 to a predetermined state therebetween.

In another example, execution of tests 602 and 604, or specific code or data units thereof, may utilize large amounts of memory, while execution of test 600, or specific code or data units thereof, may utilize a smaller amount of memory. Tests 600, 602, and 604 may thus be scheduled such that a test (or a code or data unit thereof) that utilizes a large amount of memory (e.g., test 602) runs in parallel with a test (or a code or data unit thereof) that utilizes a small amount of memory (e.g., test 600), thereby allowing the tests to be efficiently parallelized. Tests that use large and small amounts of processing resources (e.g., processor cores) may be similarly scheduled such that tests (or code or data units thereof) that utilize a large amount of processing resources are scheduled in parallel with tests (or code or data units thereof) that utilize a small amount of processing resources.

To that end, the testing device may rely on the parameters associated with each pair of code unit and software test marked with an "X," as shown in FIG. 6D, or each pair of data unit and software test marked with an "X," as shown in FIG. 6E, when scheduling software test. The testing device may additionally use these parameters, as well as the code coverage data and database coverage data shown in FIGS. 6B and 6C, when selecting the set of software tests to be executed. Namely, a software developer may desire that a set of tests evaluate at least a threshold fraction of the changed code or data and that the set of tests execute in under a threshold amount of time. That is, the software developer may wish to balance thoroughness of testing against testing time, among other criteria. The testing device may therefore be configured to receive input data indicating various testing criteria such as, for example, maximum execution time and minimum coverage of the modified code or data. The testing device may be configured to determine a set of software tests that satisfies the various testing criteria based on the first and second mappings, the code coverage data, the database coverage data, and the task graph, among other factors.

In some cases, software product 630 may be modified by the addition of code units or data units that have not yet been mapped. In such cases, the first and second mappings may be (statically) updated by parsing the added code or data units as well as any mapped code or data units to identify how the added code or data units fit into the software control flow. Alternatively or additionally, the first and second mappings may be (dynamically) updated by re-executing the plurality of software tests against software product 630 to determine an updated first mapping and an updated second mapping that accounts for the added code or data units.

Figure 9:
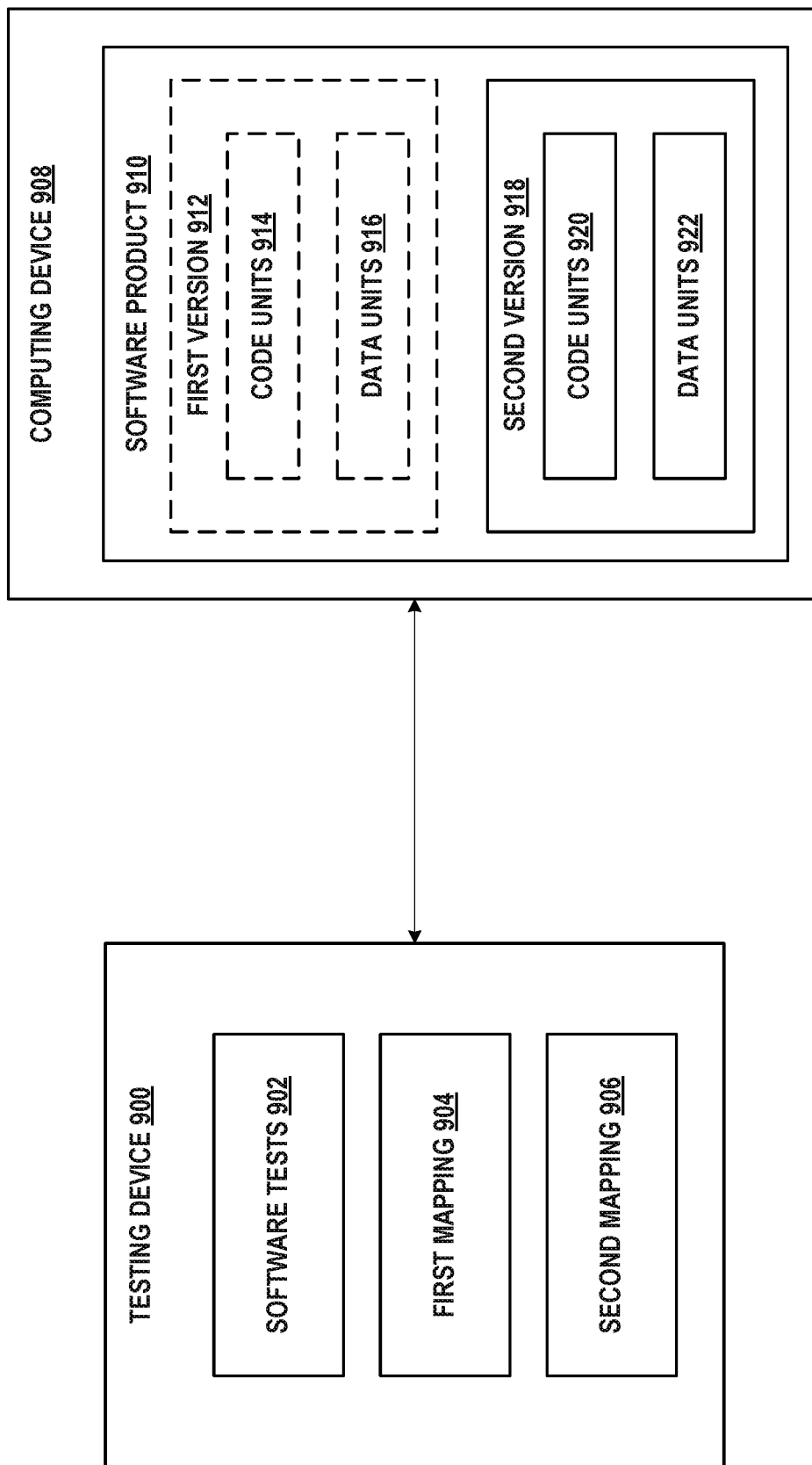
FIG. 9 illustrates a testing device, in accordance with example embodiments.

FIG. 9 illustrates an example arrangement that may be used to carry out the software testing operations described herein. Testing device 900 may store thereon a plurality of software tests 902. Testing device 900 may be communicatively connected with computing device 908, which may store thereon software product 910. Software product 910 may include a plurality of different versions representing modifications to code and data made by one or more different programmers over the course of development of software product 910. Computing device 908 may store thereon a most recent version of software product 910. Other (e.g., older) versions of software product 910 may be stored on another computing device communicatively connected to computing device 908 and/or testing device 900. The other computing device may implement a version control system, allowing for changes in software product 910 to be tracked over time and for software product 910 to be restored or "rolled-back" to an earlier version (e.g., a more stable version without defects).

First version 912 of software product 910 may include code units 914 and data units 916. Second version 918 of software product 910 may include modified code units 920 and/or modified data units 922. Second version 918 of software product 910 is shown in solid lines, while first version 912 of software product 910 is shown in dashed lines, to indicate that second version 918 is currently stored and executable on computing device 908, while first version 912 was stored on computing device 908 at an earlier time. That is, first version 912 has been replaced by second version 918, although first version 912 may still be available via the version control system.

Before second version 918 is available (i.e., while first version 912 is stored on computing device 908), testing device 900 may execute software tests 902 against computing device 908 and first version 912 of software product 910 to gather code coverage data and database coverage data. Executing software tests 902 may involve transmitting a plurality of inputs from software tests 902 on testing device 900 to first version 912 of software product 910 on computing device 908 to simulate usage of software product 910. In the case of a web-based application, for example, such testing may simulate varying loads and types of traffic to software product 910. In response, computing device 908 may transmit to testing device 900 corresponding output data as well as provide (e.g., store and/or transmit) code coverage data and database coverage data describing the extent of execution of code units 914 and data units 916.

Based on the code and database coverage data, testing device 900 may determine first mapping 904, representing a mapping between software tests 902 and code units 914, and second mapping 906, representing a mapping between software tests 902 and data units 916. When second version 918 of software product 910 becomes available (e.g., a programmer provides an updated version of a code unit or data unit), first version 910 on computing device 908 may be replaced by second version 918. Code units 920 and data units 922 may be compared to code units 914 and data units 916, respectively, to identify differences therebetween. Based on the differences, a subset of software tests 902 may be identified to test the code units and data units that are affected or are likely to be affected by the differences between first version 912 and second version 918. The identified subset of software tests may be executed against second version 918 of software product 910 to evaluate whether software product 910 still operates correctly after implementation of the changes.

In some implementations, testing device 900 and computing device 908 may represent two separate computing devices disposed at different physical locations. For example, testing device 900 may be disposed within remote network management platform 320 while computing device 908 is disposed within managed network 300, or vice versa. Alternatively, testing device 900 and computing device 908 may be two different but co-located computing devices. For example, testing device 900 may be a first computational instance within remote network management platform and computing device 908 may be another computational instance within remote network management platform 320. In yet other implementations, testing device 900 and computing device 908 may represent the same computing device. That is, all of the operations herein described may be performed on a single computing device configured to execute the software product and the software tests.

VI. EXAMPLE OPERATIONS

Figure 10:
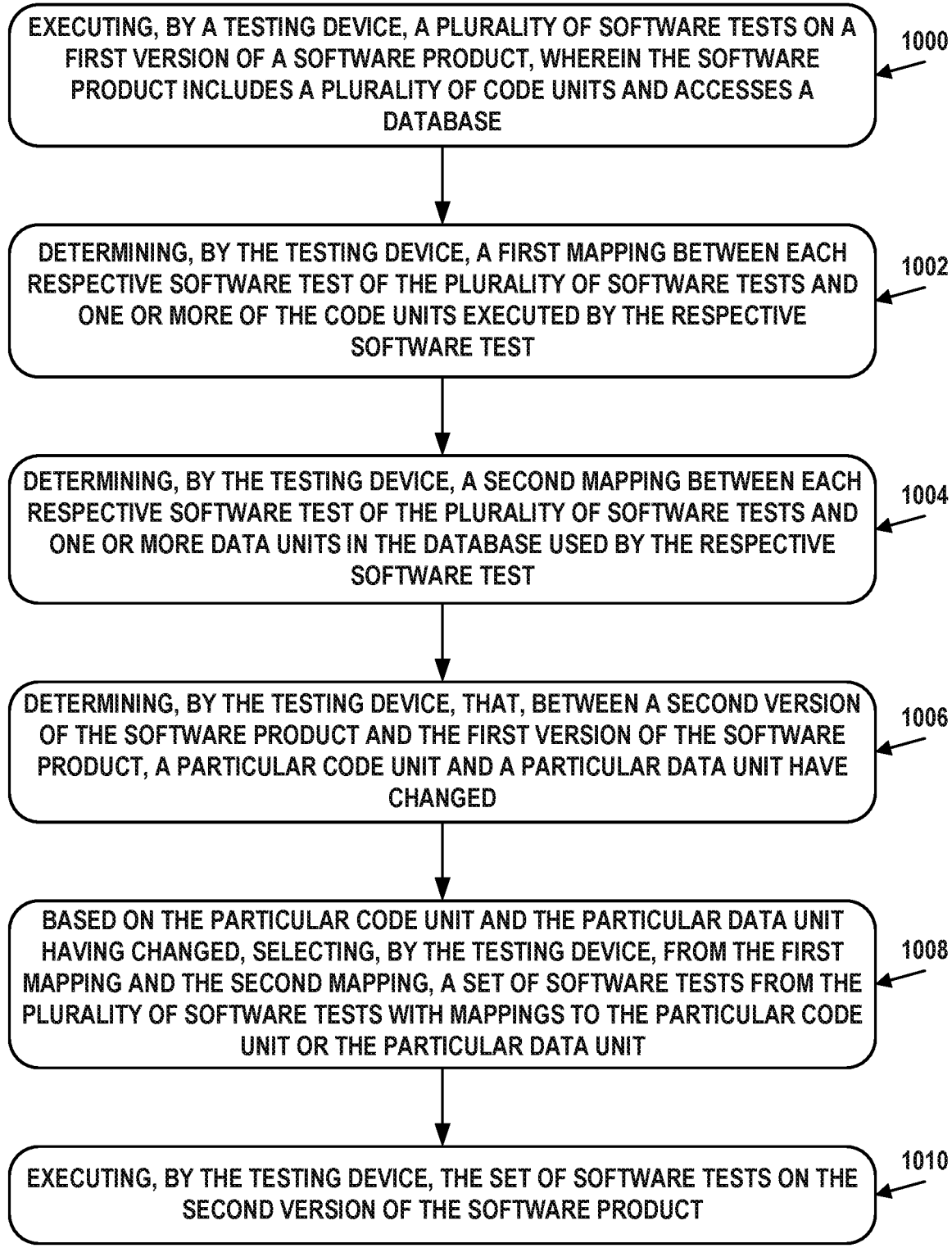
FIG. 10 is a flow chart, in accordance with example embodiments.

FIG. 10 is a flow chart illustrating an example embodiment. The process illustrated by FIG. 10 may be carried out by a computing device, such as computing device 100 or testing device 900, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve executing, by a testing device, a plurality of software tests on a first version of a software product. The software product may include a plurality of code units and may access a database.

Block 1002 may involve determining, by the testing device, a first mapping between each respective software test of the plurality of software tests and one or more of the code units executed by the respective software test.

Block 1004 may involve determining, by the testing device, a second mapping between each respective software test of the plurality of software tests and one or more data units in the database used by the respective software test.

Block 1006 may involve determining, by the testing device, that, between a second version of the software product and the first version of the software product, a particular code unit and a particular data unit have changed.

Block 1008 may involve based on the particular code unit and the particular data unit having changed, selecting, by the testing device, from the first mapping and the second mapping, a set of software tests from the plurality of software tests with mappings to the particular code unit or the particular data unit.

Block 1010 may involve executing, by the testing device, the set of software tests on the second version of the software product.

In some embodiments, the set of software tests may be selected from one of the first mapping or the second mapping. That is, code coverage data and database coverage data may each be used independently to select the set of software tests. For example, the set of tests may be selected from the first mapping, without using the second mapping, or vice versa.

In some embodiments, the one or more data units in the database used by the respective software test may be data values stored in the database.

In some embodiments, the one or more data units in the database used by the respective software test may be table structures stored in the database.

In some embodiments, a computing device may be configured to operate the software product. The testing device may be communicatively connected to the computing device and configured to execute the plurality of software tests against the computing device.

In some embodiments, determining the first mapping may involve determining, based on executing the plurality of software tests on the software product, code coverage data indicating execution of the one or more of the code units by the respective software test.

In some embodiments, determining the code coverage data may involve determining, for each respective code unit of the one or more of the code units, a fraction of the respective code unit executed by the respective software test and determining an execution time of the respective code unit.

In some embodiments, selecting the set of software tests may involve, based on (i) the fraction of the respective code unit executed by the respective software test and (ii) the execution time of the respective code unit, determining a combination of software tests of the plurality of software tests that covers at least a threshold fraction of the software product in under a threshold amount of time.

In some embodiments, determining the first mapping may involve determining a dependency indicating an order in which the one or more of the code units are executed by the respective software test.

In some embodiments, the dependency may also indicate an additional order in which at least a portion of the one or more of the code units are retrieved from the database when executing the respective software test.

In some embodiments, selecting the set of software tests may involve, based on the determined dependency, identifying combinations of parallelizable software tests from the plurality of software tests.

In some embodiments, determining the second mapping by may involve determining a first snapshot of the database before executing the respective software test on the software product, determining a second snapshot of the database after executing the respective software test on the software product, and comparing the first snapshot to the second snapshot to identify the one or more data units in the database that have been modified by the respective software test.

In some embodiments, determining the second mapping may involve determining a time of a last update to the database, determining whether the time of the last update is within a time of execution of the respective software test, and when the time of the last update is within the time of execution of the respective software test, determining that the respective test modified the one or more data units in the database.

In some embodiments, determining the second mapping may involve determining a dependency indicating an order in which the one or more of the data units in the database are used by the respective software test.

In some embodiments, the dependency may also indicate an additional order in which at least a portion of the one or more of the data units in the database are used by the one or more of the code units when executing the respective software test.

In some embodiments, selecting the set of software tests by may involve, based on the determined dependency, identifying combinations of parallelizable software tests from the plurality of software tests. Modifications of the one or more data units in the database by the combinations of parallelizable software tests may be mutually exclusive.

In some embodiments, a system may involve means for executing a plurality of software tests on a first version of a software product. The software product may include a plurality of code units and may access a database. The system may also include means for determining a first mapping between each respective software test of the plurality of software tests and one or more of the code units executed by the respective software test. The system may additionally include means for determining a second mapping between each respective software test of the plurality of software tests and one or more data units in the database used by the respective software test. The system may yet additionally include means for determining that, between a second version of the software product and the first version of the software product, a particular code unit and a particular data unit have changed. The system may further include means for, based on the particular code unit and the particular data unit having changed, selecting, by the testing device, from the first mapping and the second mapping, a set of software tests from the plurality of software tests with mappings to the particular code unit or the particular data unit. The system may yet further include means for executing the set of software tests on the second version of the software product.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
   a processor; and
   a memory, accessible by the processor, the memory storing instructions, that when executed by the processor, cause the processor to perform operations comprising:
   determining respective mappings between a plurality of software tests executed against a software product to debug the software product and (1) a plurality of code units of the software product and (2) a plurality of data units used by the software product in one or more databases, wherein the software product has been modified from a first version of the software product to a second version of the software product;
   generating a task graph based on the respective mappings, wherein the task graph comprises one or more dependencies between the plurality of software tests, the plurality of code units, and the plurality of data units;
   determining a hierarchy of potential error sources in the software product based on the task graph, wherein the hierarchy of potential error sources comprise one or more unmodified code units of the plurality of code units proximate to one or more modified code units of the plurality of code units or one or more modified data units of the plurality of data units, or one or more unmodified data units of the plurality of data units proximate to the one or more modified code units of the plurality of code units or the one or more modified data units of the plurality of data units, or both; and
   transmitting a graphical representation of the hierarchy of potential error sources to one or more computing devices for display.

2. The system of claim 1, wherein determining the hierarchy of potential error sources comprises identifying respective proximities of the one or more unmodified code units, or the one or more unmodified data units, or both, to the one or more modified code units, or the one or more modified data units, or both.

3. The system of claim 1, wherein a highest potential error source of the hierarchy of potential error sources comprises the one or more unmodified code units, or the one or more unmodified data units, or both, closest to the one or more modified code units, the one or more modified data units, or both.

4. The system of claim 1, wherein the one or more dependencies are indicative of respective orders in which the plurality of code units are executed and the plurality of data units are accessed or modified in response to execution of the plurality of software tests.

5. The system of claim 1, wherein the task graph comprises a graphical representation of the respective mappings, and wherein the operations comprise transmitting the task graph to the one or more computing devices for display.

6. The system of claim 1, wherein the respective mappings comprise a first mapping between the plurality of software tests and the plurality of code units, and a second mapping between the plurality of software tests and the plurality of data units.

7. The system of claim 1, wherein the plurality of data units comprise one or more table structures in the one or more databases that organize data in the one or more databases, or the data in the one or more databases is organized by the one or more table structures, or both.

8. A method, comprising:
   determining, via one or more processors, respective mappings between a plurality of software tests executed against a software product to debug the software product and (1) a plurality of code units of the software product and (2) a plurality of data units used by the software product in one or more databases, wherein the software product has been modified from a first version of the software product to a second version of the software product;
   generating, via the one or more processors, a task graph based on the respective mappings, wherein the task graph comprises a graphical representation of the respective mappings and one or more dependencies between the plurality of software tests, the plurality of code units, and the plurality of data units, and the one or more dependencies are indicative of respective orders in which the plurality of code units are executed and the plurality of data units are accessed or modified in response to execution of the plurality of software tests;
   determining, via the one or more processors, a hierarchy of potential error sources in the software product based on the task graph, wherein the hierarchy of potential error sources comprise one or more unmodified code units of the plurality of code units proximate to one or more modified code units of the plurality of code units or one or more modified data units of the plurality of data units, or one or more unmodified data units of the plurality of data units proximate to the one or more modified code units of the plurality of code units or the one or more modified data units of the plurality of data units, or both; and
   transmitting, via the one or more processors to the one or more computing devices, a graphical representation of the hierarchy of potential error sources.

9. The method of claim 8, wherein determining the hierarchy of potential error sources comprises identifying respective proximities of the one or more unmodified code units, or the one or more unmodified data units, or both, to the one or more modified code units, or the one or or more modified data units, or both.

10. The method of claim 8, wherein a highest potential error source of the hierarchy of potential error sources comprises the one or more unmodified code units, or the one or more unmodified data units, or both, closest to the one or more modified code units, the one or more modified data units, or both.

11. The method of claim 8, comprising transmitting, via the one or more processors, the task graph to the one or more computing devices for display.

12. The method of claim 8, wherein the respective mappings comprise a first mapping between the plurality of software tests and the plurality of code units, and a second mapping between the plurality of software tests and the plurality of data units.

13. A non-transitory, computer-readable medium, comprising instructions, that when executed by one or more processors, cause the one or more processors to perform operations comprising:
: determining respective mappings between a plurality of software tests executed against a software product to debug the software product and (1) a plurality of code units of the software product and (2) a plurality of data units used by the software product in one or more databases, wherein the software product has been modified from a first version of the software product to a second version of the software product;
: generating a task graph based on the respective mappings, wherein the task graph comprises one or more dependencies between the plurality of software tests, the plurality of code units, and the plurality of data units;
: determining a hierarchy of potential error sources in the software product based on the task graph, wherein the hierarchy of potential error sources comprise one or more unmodified code units of the plurality of code units proximate to one or more modified code units of the plurality of code units or one or more modified data units of the plurality of data units, or one or more unmodified data units of the plurality of data units proximate to the one or more modified code units of the plurality of code units or the one or more modified data units of the plurality of data units, or both; and
: transmitting a graphical representation of the hierarchy of potential error sources to one or more computing devices for display.

14. The non-transitory, computer-readable medium of claim 13, wherein the operations comprise modifying the software product from the first version of the software product to the second version of the software product.

15. The non-transitory, computer-readable medium of claim 14, wherein the operations comprise selecting a set of software tests from the plurality of software tests, wherein each test in the set of software tests is mapped to a particular code unit of the one or more modified code units, or a particular data unit of the one or more modified data units, or both, as a result of the software product being modified from the first version to the second version.

16. The non-transitory, computer-readable medium of claim 15, wherein the operations comprise executing the set of software tests against the second version of the software product.

17. The non-transitory, computer-readable medium of claim 16, wherein the set of software tests comprise one or more combinations of parallelizable software tests.

18. The non-transitory, computer-readable medium of claim 13, wherein the one or more dependencies are indicative of respective orders in which the plurality of code units are executed and the plurality of data units are accessed or modified in response to execution of the plurality of software tests.

* * * * *